United States Patent [19]

Wilson et al.

[11] 3,920,177
[45] Nov. 18, 1975

[54] HOT WORKING OF ENCLOSURES

[75] Inventors: Stanley George Wilson, Frodsham; Norman Wilson Smith, Hoylake, both of England

[73] Assignee: John Kerr & Co. (Manchester) Limited, Liverpool, England

[22] Filed: Sept. 19, 1973

[21] Appl. No.: 398,921

[30] Foreign Application Priority Data
Sept. 26, 1972 United Kingdom............... 44304/72

[52] U.S. Cl............. 228/218; 219/72; 113/120 DD; 228/214
[51] Int. Cl.$^2$........................................ B23K 35/38
[58] Field of Search........ 29/488, 494; 113/120 DD; 219/72

[56] References Cited
UNITED STATES PATENTS

| | | | |
|---|---|---|---|
| 1,613,061 | 1/1927 | Smith............................... | 29/494 X |
| 2,450,120 | 9/1948 | Cate................................. | 29/494 X |
| 3,338,499 | 8/1967 | Gilbert............................. | 29/494 X |

FOREIGN PATENTS OR APPLICATIONS

| | | | |
|---|---|---|---|
| 46-35481 | 10/1971 | Japan.................................... | 29/488 |

OTHER PUBLICATIONS

Welding Metallurgy, Vol. 1, by George E. Linnert, 1965, N.Y., pp. 88, 106, Technical Literature in P.O. Library.

*Primary Examiner*—Ronald J. Shore
*Attorney, Agent, or Firm*—Oblon, Fisher, Spivak, McClelland & Maier

[57] ABSTRACT

Disclosed is a method of carrying out hot work such as welding, on enclosures, such as metal tanks, which includes the steps of filling all the available space within the enclosure with a high expansion fire-fighting foam, gasified with an inert gas, and then passing such foam continuously through said enclosure to maintain its filled condition whilst hot working is carried out.

Also disclosed is a foam-making appliance for use in such a method which comprises a generally cylindrical hollow body, injector means attached to the inlet end thereof for feeding water and foam compound to said body and having a through bore communicating with said body, venturi means mounted in said through bore so as to extend into said body and adapted, when water under pressure is passed therethrough, to cause to be entrained in the water a supply of foam compound made available at the venturi passage, a diffuser at the end of the venturi means within said body adapted to diffuse the water-foam compound mixture substantially radially a reticulate member of conical form surrounding said diffuser, its apex extending towards the outlet end of the body, an inlet near the inlet end of said body through which an inert gas may be admitted, and a plate lying transversely of said body having a plurality of small apertures therein through which the inert gas is diffused before combining with the water-foam compound mixture to pass together through said reticulate member to form foam.

4 Claims, 1 Drawing Figure

U.S. Patent Nov. 18, 1975 3,920,177
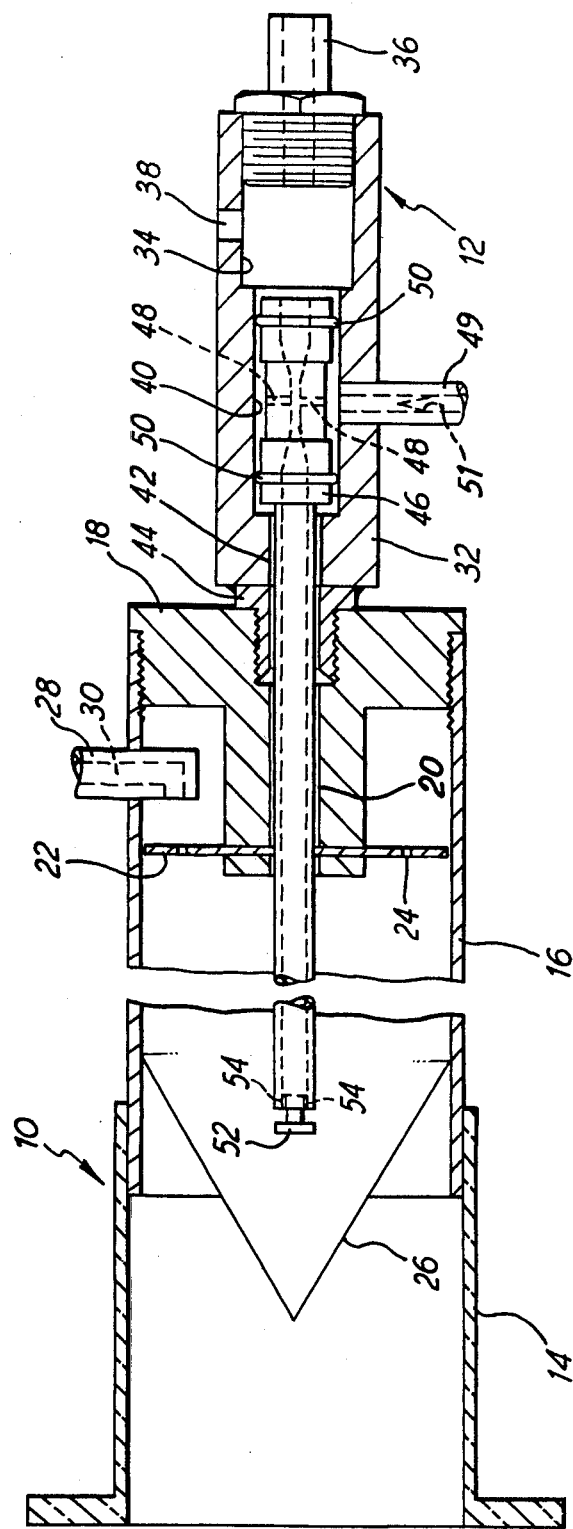

HOT WORKING OF ENCLOSURES

This invention concerns the hot working of enclosures.

There are many occasions when it is wished to carry out hot work (e.g. welding) on enclosures such as tanks which contain explosive or highly flammable gases or liquids or both. Hitherto it has been necessary to evacuate the tank since otherwise the danger to the operator due to explosion or fire or both was quite unacceptable. Evacuation can be, and usually is a difficult and time-consuming matter.

The object of the present invention is to provide a safe method of hot working such enclosures which avoids the need for evacuation, and also to provide certain improved apparatus for use in carrying out such a method.

According to the present invention the method includes the steps of filling all the available space within the enclosure with a high expansion fire-fighting foam, gasified with an inert gas, and then passing such foam continuously through said enclosure to maintain its filled condition whilst hot working is carried out.

For supplying the foam we provide, also according to the present invention, a foam-making appliance which comprises a generally cylindrical hollow body, injector means attached to the inlet end thereof for feeding water and foam compound to said body and having a through bore communicating with said body, venturi means mounted in said through bore so as to extend into said body and adapted, when water under pressure is passed therethrough, to cause to be entrained in the water a supply of foam compound made available at the venturi passage, a diffuser at the end of the venturi means within said body adapted to diffuse the water-foam compound mixture substantially radially, a reticulate member of conical form surrounding said diffuser, its apex extending towards the outlet end of the body, an inlet near the inlet end of said body through which an inert gas may be admitted, and a plate lying transversely of said body having a plurality of small apertures therein through which the inert gas is diffused before combining with the water foam-compound mixture to pass together through said reticulate member to form foam. Preferably at least the outlet end of said body is made of transparent material.

The invention will now be described further, by way of example only, with reference to a particular foam-making appliance and a general method of hot-working an enclosure containing explosive gas or liquid or both.

In this example a test enclosure consisted of an all-welded tank 6 feet long, 4 feet wide and 4 feet high, fitted at the top with a 2 inch diameter flanged filling pipe at one end and a similar outlet pipe at the other end. The tank was tilted six inches up at the outlet pipe end and three-quarters of an inch diameter holes were drilled in each top corner of the tank and fitted with removable plugs.

The tank was first filled with crude oil which was then run off, leaving the usual residue behind. Then 3 gallons of 100 octane petrol were poured into the tank and left there. The gas content of the tank was tested and found to be highly explosive.

By means of the foam-forming appliance shortly to be described, and via the inlet pipe, the tank was filled with high expansion foam made from water and foam compound available commercially under the name KOMET and gasified with carbon dioxide. The plugs were removed briefly to demonstrate that the tank was full of foam. As foam continued to be supplied excess passed away from the tank via the outlet pipe. Whilst this state of affairs continued a one-and-a-half inch hole was flame-burned in the tank side at about mid-length and about a third of the way down the tank side, and thereafter a plate doubler was oxy-acetylene welded over the hole. These operations were carried out without danger to the operative as the oxygen available within the tank was quite inadequate to support combustion.

The foam-making appliance used will now be described in some detail with reference to the single FIGURE of the accompanying drawing, which is a part-sectional elevation thereof.

The appliance consists basically of a hollow cylindrical body 10 and an injector 12 for feeding a water and foam-compound mixture thereto.

The body 10 consists of a transparent flanged outlet end 14 of methyl methacrylate secured to a metal inlet end 16. The inlet end 16 is fitted securely with a large plug 18 having a through bore 20 and carrying a thin metal plate 22 with a series of four holes 24, equi-spaced therearound, and not far distant from its periphery. The inlet end of the bore 20 is enlarged and screw-threaded. Mounted across the body 16, downstream of the plate 22 is a "net" 26 of conical shape of the type conventionally used in such appliances. The inner end of the plug 18 is of reduced diameter, and at the corresponding portion of the inlet end 16 of the body 10 is an inlet pipe 28 with an elbowed bore 30 disposed to admit gas towards the plate 22.

The injector 12 consists of a metal piece 32 of hexagonal cross-section having a through bore of varying diameter. At the inlet end is the largest-diameter portion 34, screw-threaded for part of its length to receive a water-inlet fitment 36. Also a transverse passage 38 is provided to facilitate the attachment of a pressure gauge (not shown). The middle part 40 of the bore is of somewhat smaller diameter and the downstream end 42 of the bore of smaller diameter still. At this end, the injector means 12 has welded or brazed thereto a screw-threaded connector 44 by means of which it is attached to the plug 18.

The injector 12 carries a venturi pipe 46 part of which is accommodated in the injector 12 and part of which extends into the body 10 up to the net 26. The upstream end of the pipe 46 has two larger-diameter portions spaced apart by a smaller-diameter portion, and there are two oppositely disposed transverse holes 48 extending through the wall of the smaller-diameter portion to the neck of a venturi bore in the pipe 46. Through the wall of the injector 12 corresponding to the smaller diameter portion is a bore which receives an inlet member 49 controlled by a needle valve 51. The two larger-diameter portions each carry an O-ring 50 to ensure sealing contact with the bore of the injector 12. The downstream end of the pipe 46 consists of a long portion of smaller diameter still, which extends through the connector 44 and the plug 18 up to the net 26. A bore extends therealong, as a continuation of the venturi bore. The downstream end of the injector 46 is closed by a flanged end-piece 52 which serves to diffuse liquid passing down the pipe 46 and emerging through holes 54 in the end thereof, in a radial direction.

In use a water supply of at least forty pounds per square inch pressure (as may usually be obtained from a domestic tap) is connected to the fitment 36. To the needle-valve controlled inlet member 49 is connected a supply of foam compound, and to the inlet pipe 28 is connected a supply of carbon dioxide or other suitable inert gas at a maximum pressure of four pounds per square inch. A supply of high-expansion foam suitable for use in filling the test tank previously referred to results and by clamping the flange of the body 10 which is of appropriate dimensions to the flange of the tank inlet pipe this foam may be fed to the tank in the manner indicated.

The foam-making appliance just described has many advantageous features. Thus, it can be sized for convenient manual operation, and, indeed, in such versions, has general use as a manual fire-extinguisher, using air instead of an inert gas, where the necessary supplies are available. Again, the fact that it can utilize tap water is very convenient. Another advantage is that by standardizing sizes, interchangeable pipes 46, may be used according to requirements. The provision of a transparent end to the body 10 facilitates visual confirmation that foam is being properly produced.

Naturally the method according to the invention may be carried out with other gas making appliances. For example, with an enclosure having a large inlet aperture, a conventional appliance may be used (these are much larger than the preferred versions of the appliance described hereinbefore) with its air inlets blanked off and a supply of inert gas employed.

We claim:

1. A method of preventing the explosive ignition or flaming of vapors during hot work, such as welding, on enclosures, such as metal tanks, comprising the steps of filling all of the available space within said enclosure with a high expansion fire-fighting foam, gasified with an inert gas, and then passing said foam continuously through said enclosure in quantities sufficient to ensure that said enclosure maintains said filled condition while said hot work is performed.

2. A method as claimed in claim 1 in which said foam is made from water and a foam compound, gasification being with carbon dioxide.

3. A method as claimed in claim 1 in which the hot working is oxy-ocetylene welding.

4. A method as claimed in claim 1 in which the foam is continuously supplied to an inlet aperture in said enclosure by a foam-making appliance, and continuously removed therefrom via an outlet aperture therein.

* * * * *